(12) United States Patent
Cohen et al.

(10) Patent No.: US 6,792,559 B1
(45) Date of Patent: Sep. 14, 2004

(54) PERFORMING OPERATIONS IN AN ENVIRONMENT RECREATED FROM SYSTEM DUMP INFORMATION

(75) Inventors: Steven B. Cohen, Redondo Beach, CA (US); Richard H. Hanson, Cerritos, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/557,709

(22) Filed: Apr. 25, 2000

(51) Int. Cl.[7] .............................................. G06F 11/00
(52) U.S. Cl. ........................................... 714/15; 703/26
(58) Field of Search ............................ 714/15, 37, 28, 714/29, 20, 19, 39, 38; 703/26, 28

(56) References Cited

U.S. PATENT DOCUMENTS

| | | | | |
|---|---|---|---|---|
| 5,111,384 A | * | 5/1992 | Aslanian et al. | 714/26 |
| 5,303,383 A | | 4/1994 | Neches et al. | |
| 5,572,709 A | * | 11/1996 | Fowler et al. | 703/27 |
| 5,640,584 A | | 6/1997 | Kandasamy et al. | |
| 5,790,777 A | * | 8/1998 | Izuta et al. | 714/45 |
| 5,872,904 A | | 2/1999 | McMillen et al. | |
| 5,999,933 A | * | 12/1999 | Mehta | 707/100 |
| 6,141,635 A | * | 10/2000 | Paul et al. | 703/22 |
| 6,226,761 B1 | * | 5/2001 | Berstis | 714/37 |
| 6,230,114 B1 | * | 5/2001 | Hellestrand et al. | 703/13 |
| 6,256,751 B1 | * | 7/2001 | Meth et al. | 714/15 |
| 6,430,707 B1 | * | 8/2002 | Matthews et al. | 714/37 |

* cited by examiner

Primary Examiner—Robert Beausoliel
Assistant Examiner—Christopher S McCarthy
(74) Attorney, Agent, or Firm—Trop, Pruner & Hu, P.C.

(57) ABSTRACT

A diagnosis system includes procedures to perform various operations, including diagnosis of problems, in a run-time environment recreated from dump information. The dump information is saved in response to a fault occurring in a node, which may be part of a parallel processing system. The diagnosis system may be separate from the parallel processing system or it may be one of the nodes of the parallel processing system. Setting up the run-time environment includes identifying memory sections associated with a task that caused the fault and filling the identified memory sections with data extracted from the dump information. Diagnosis procedures may then be run in the recreated run-time environment. The diagnosis may be the same diagnosis procedures used in a live run-time environment to save time and costs associated with writing such diagnosis procedures.

12 Claims, 7 Drawing Sheets

PERFORMING OPERATIONS IN AN ENVIRONMENT RECREATED FROM SYSTEM DUMP INFORMATION

BACKGROUND

The invention relates to performing operations in an environment recreated from system dump information.

Software in a computer system may be made up of many layers. The highest layer is usually referred to as the application layer, followed by lower layers that include the operating system, device drivers (which usually are part of the operating system), and other layers. In a system that is coupled to a network, various transport and network layers may also be present.

During execution of various software routines or modules in the several layers of a system, errors or faults may occur. Such faults may include addressing exceptions, arithmetic faults, and other system errors. A fault handling mechanism is needed to handle such faults so that a software routine or module or even the system can shut down gracefully. For example, clean-up operations may be performed by the fault handling mechanism, and may include the deletion of temporary files and freeing up of system resources. In many operating systems, exception handlers are provided to handle various types of faults (or exceptions). For example, exception handlers are provided in WINDOWS® operating systems and in UNIX operating systems.

An image of the system may also be dumped into one or more files in response to a fault. The dump information may then be used for subsequent analysis to determine the cause of the fault.

Various routines may be executed during live operation of a system that can access predetermined contextual information, which information may be displayed or used to perform diagnosis of problems in the system. However, when a system fault occurs, the run-time environment that existed during live operation of the system is no longer present. One possible technique to diagnose problems after dump information has been saved is to write routines that can specifically work with the dump information. However, this results in duplication of diagnosis routines, ones for a live run-time environment and ones for working with dump information. As a result, the time and labor required for creating such diagnosis routines are increased.

A need thus continues to exist for a more efficient method and apparatus of performing diagnosis of a system once a fault occurs and dump information has been stored.

SUMMARY

In general, according to one embodiment, a method for use in a system includes recreating a run-time environment from dump information and performing a diagnosis or other operation in the recreated run-time environment.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
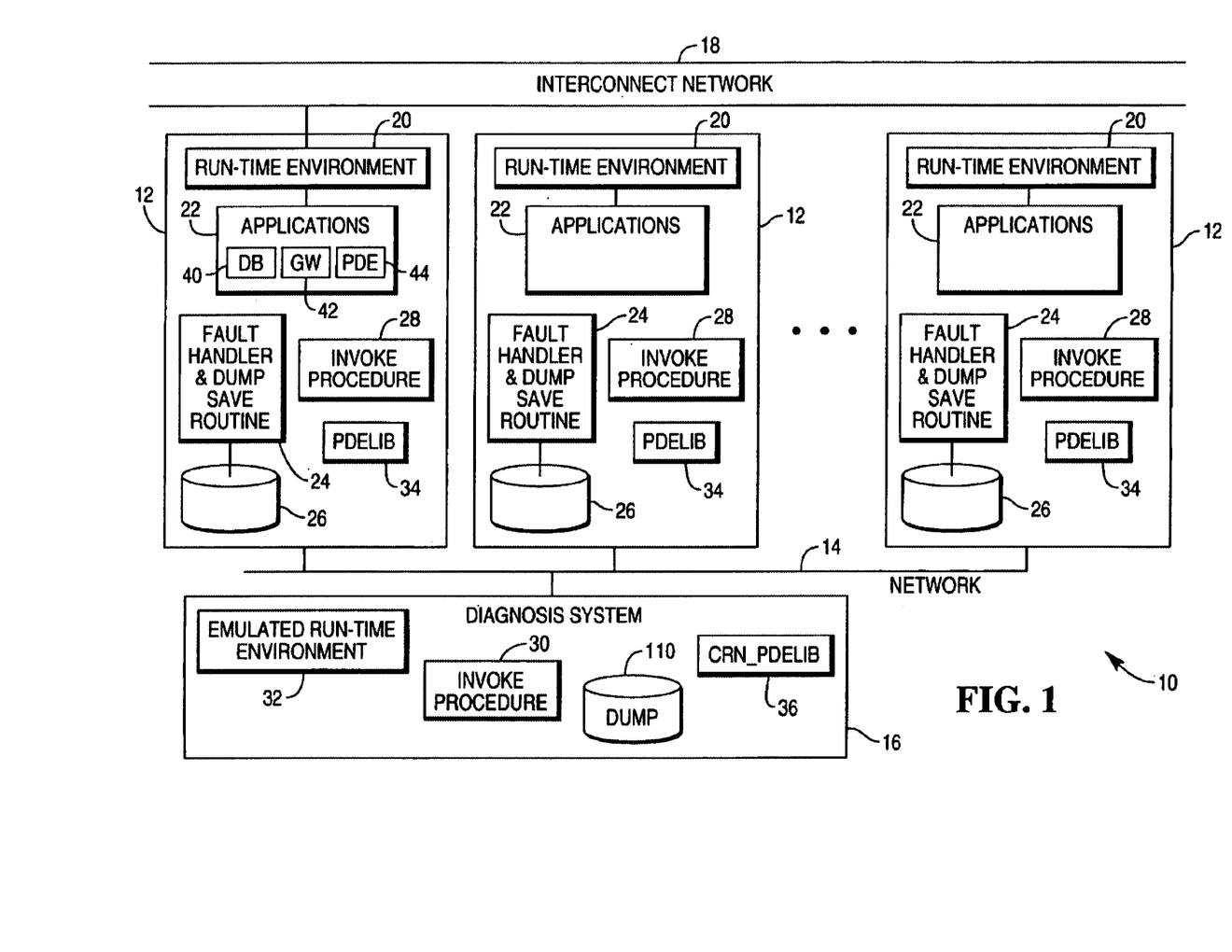
FIG. 1 is a block diagram of an embodiment of a multi-node parallel processing system.

Referring to FIG. 1, an example system 10 is illustrated. The system is a multinode parallel processing system. However, in other embodiments, a single-node system may be employed. The system 10 includes plural nodes 12 that are interconnected by an interconnect network 18. In addition, each of the nodes 12 may be coupled to a network 14, which may be a local area network (LAN) or wide area network (WAN) for example. The network 14 may also include a public network such as the Internet.

A diagnosis system 16 may be coupled to the network 14 for performing analysis of dump information collected by the nodes 12 of the system 10 in case of a fault or crash in one or more of the nodes 12. The diagnosis system 16 may be considered part of or separate from the parallel processing system 10. In another arrangement, one of the nodes 12 may be used in performing such analysis so that a separate diagnosis system 16 is not needed. In one embodiment, dump information is retrieved from the one or more nodes 12 by the diagnosis system 16 for subsequent analysis in the system 16. Dump information refers to information that relate to execution of software and the state of a node at the time of a fault or crash.

Each node 12 includes one or more application modules 22 that are executed in a run-time environment 20. The run-time environment 20 may be defined by an operating system as well as contextual information relating to processes and threads running in the system. The operating system may be a Windows® system, such as a Windows® NT operating system. However, other types of operating systems may also be employed. The concept of processes and threads exist in a Windows® operating system, such as the Windows® NT operating system. A process is an object that represents an instance of an executing program. Each process may be associated with one or more threads of execution. A thread is the basic executable in a Windows® operating system. As used here, the term "task" may refer to any software module, routine, or other element that is executable in a system. In a Windows® operating system, a task may refer to a thread or a collection of threads. In other operating systems, a task may refer to processes or other units of execution.

In one embodiment, the application modules 22 may be part of a data warehousing system. Generally, a data warehouse may include copies of transaction data (e.g., retail transaction data) that have been structured for query and analysis or reporting. The retail transaction data may track purchases made by users of goods and services from participating retail sources. The data warehousing application may perform the collection, management, analysis, and reporting of such transaction data. The volume of data involved in data warehouse systems may be extremely large, typically in the gigabyte range and sometimes in the terabyte range. To handle such large amounts of data, a data warehousing system is implemented on a multi-node parallel processing system, such as system 10.

Application modules 22 that are associated with a data warehouse system may include database management modules 40 to implement the logical operation of the database, gateway modules 42 to handle connections to client applications, and other modules 44 for memory management, performance of parallel services, lock management, and so forth. Such other modules 44 may be referred to as "parallel database extensions" (PDE) modules. Although various modules and routines described herein are given labels, such labels are provided for the sake of clarity and are not intended to limit the scope of the invention. In addition, although several software modules may be included in connection with the various described embodiments, other embodiments may have a larger or smaller number of modules and may divide performance of various operations differently among the modules.

In each node 12, during execution of the various processes and threads in the runtime environment 20, a fault may occur. When that happens, a fault handler 24 may be invoked to handle the fault. The fault handler 24 stops execution of the application modules 22 and launches a dump save routine to store dump information into a dump database 26. The process may be performed in each of the nodes 12.

The dump database 26 may include the following types of information. Information about each thread (referred to as a "thread context") may be stored. The thread context may include values of machine registers (e.g., stacks) associated with the thread and the function/subroutine calling history of the thread. In addition, information about each process (referred to as a "process context") may also be stored. The process context may include a pointer to the list of thread contexts for the process and the name of the program that was in execution and all memory (and associated memory address) that was writable to any thread in the process. The dump database 26 may also include the "node context," which includes a pointer to a list of processes on the node that have been dumped. The dump database 26 may also include any application-related files that are resident on the node and that need to be included in the dump.

In one arrangement, after the dump information is collected in a node 12, the dump information may be communicated to the diagnosis system 16 over the network 14 and stored in a dump database 110 (also referred to as a dump 110). The diagnosis system 16 may launch one or more invoke procedures 30 to perform the analysis. To do so, a run-time environment 32 may be recreated or emulated in the diagnosis system 16 from the stored dump 110, with the invoke procedures 30 executed in the recreated or emulated run-time environment 32. The invoke procedures 30 may be the same invoke procedures 28 that are executed in each of the nodes 12 to perform diagnosis during live operation. Doing so avoids the need for different sets of invoke procedures, one for a live system and another to analyze dump information. As a result, time and labor involved in writing invoke procedures for diagnosing problems in the system 10 may be reduced.

In accordance with some embodiments, the diagnosis system 16 also runs a special library (CRN_PDELIB) 36 that is a substitute for a run-time library (PDELIB) 34 executed in each node 12 during live operation. The run-time library PDELIB 34 in each node 12 provides the interface to service routines that are part of the PDE application 44. Thus, during live operation in each node 12, calls to various services provided by the PDE application 44 are handled by the run-time library PDELIB 34. However, calls made by the invoke procedures 30 during diagnosis in the recreated run-time environment 32 may be handled by the special library CRN_PDEL1B 36.

In another embodiment, the various modules in the diagnosis system 16 may also be present in one of the nodes 12 if the one node is used to perform diagnosis in place of the diagnosis system 16.

Figure 2:
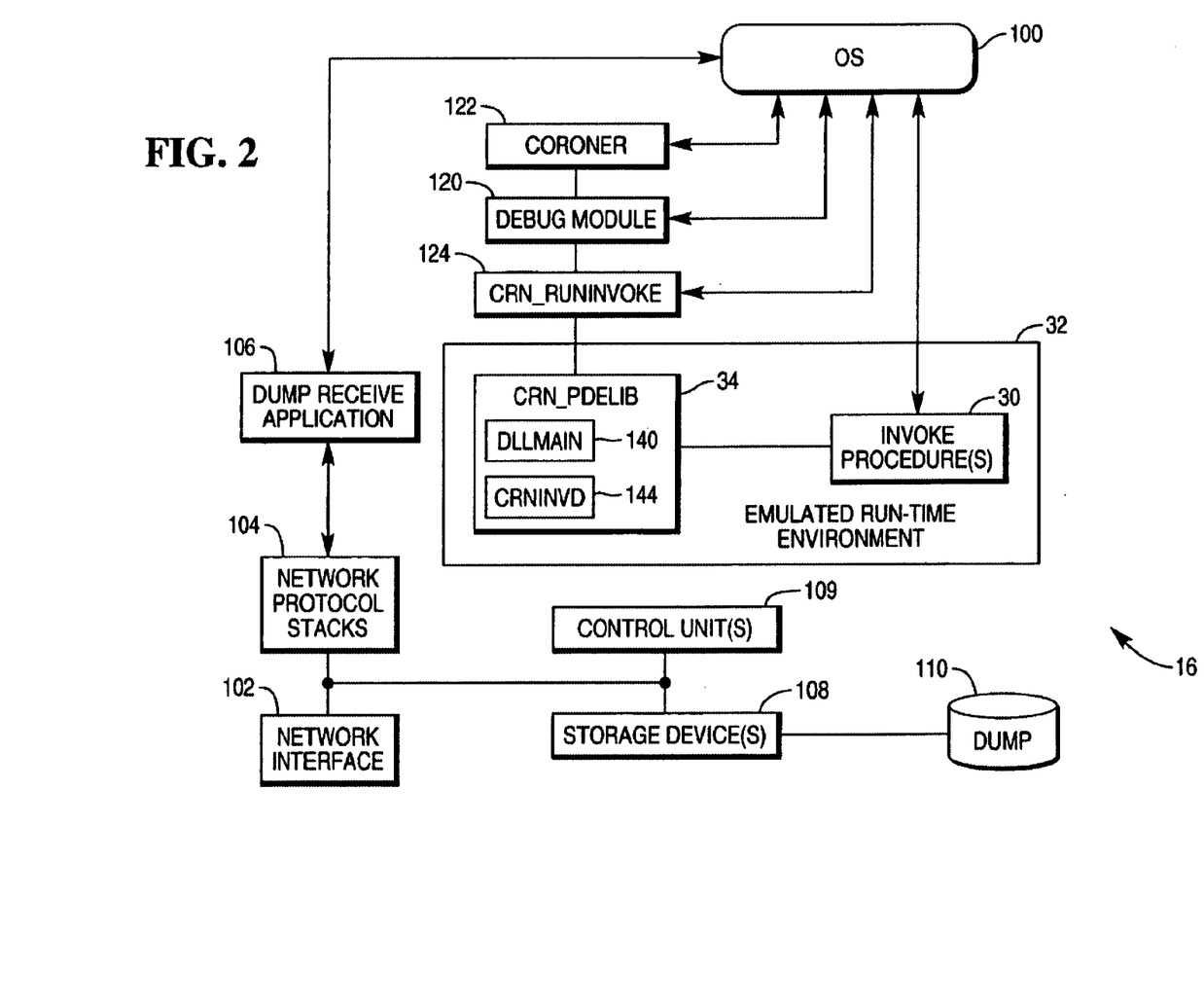
FIG. 2 is a block diagram of components in a diagnosis system in accordance with an embodiment for use with the parallel processing system of FIG. 1.

Referring to FIG. 2, components of the diagnosis system 16 in accordance with an embodiment are illustrated. The various software modules shown in FIG. 2 do not necessarily run concurrently in the system 16. The diagnosis system 16 may include a network interface 102 that may be coupled to the network 14. Various transport or network protocol layers 104 may be present in the system 16. Such transport and network protocol layers may include, as examples, TCP/IP or UDP/IP layers. TCP is described in RFC 793, entitled "Transmission Control Protocol," dated September 1981; and UDP is described in RFC 768, entitled "User Datagram Protocol," dated August 1980. TCP and UDP are transport layers for managing connections between end points coupled to an IP network. IP stands for Internet Protocol, and is described in RFC 791, entitled "Internet Protocol," dated September 1981.

The network interface 102 may be employed to receive dump information from one or more of the nodes 12 over the network 14. The dump information is passed through the transport and network protocol layers 104 to a dump receive application 106. The dump receive application 106 manages the storing of the dump information in the dump 110 contained in one or more storage devices 108.

The diagnosis system 16 also includes an operating system 100, which may be a Windows® operating system, such as the Windows® NT operating system. To perform diagnosis of dump information stored in the dump 110, various modules may be present, including a debug module 120, a coroner subsystem 122, a CRN_RUNINVOKE module 124, the CRN_PDELIB library 34, the invoke procedures 30, and other routines and modules as described further below. The CRN_PDELIB library 34 and invoke procedures 30 are executed in the run-time environment 32 recreated from the dump 110.

Figure 3:
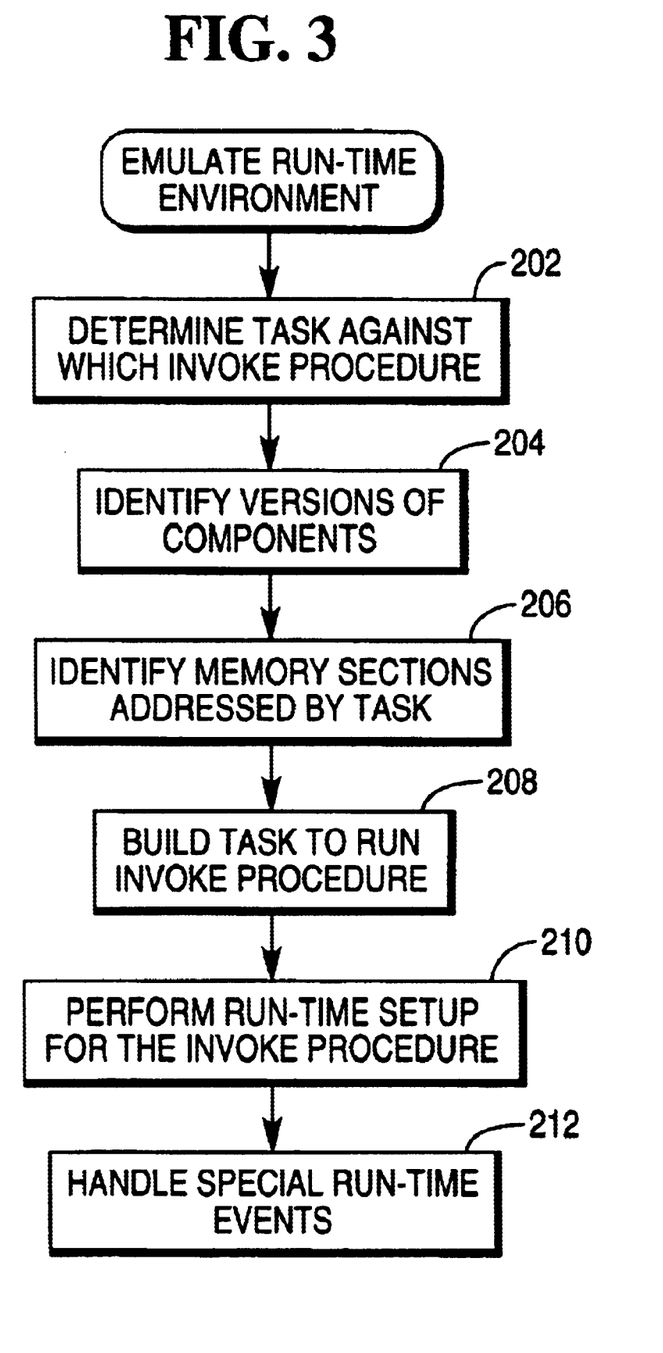
FIG. 3 is a flow diagram of a process of emulating a run-time environment in accordance with one embodiment.

Referring further to FIG. 3, the process of emulating or recreating the run-time environment in the diagnosis system 16 is illustrated. The process is performed by one or more of the modules that are present in the diagnosis system 16. FIG. 3 provides a brief overview of the various operations performed in the emulation process each of the operations are further described in connection with FIGS. 4–8.

The diagnosis system 16 first determines (at 202) the task (process and thread) against which the invoke procedure is to be run. This may be a user-specified task specified in a user interface provided by the debug module 120. From the dump 110, the versions of the various modules that were running in each node 12 at the time of the fault are identified (at 204). In one embodiment, plural versions of each application module 22 may be present in each node 12, with one being the running version and the other(s) being inactive. To properly diagnose any problems that may be present, the correct versions that were running at the time of the fault are identified.

The diagnosis system 16 also identifies (at 206) memory sections that are addressed by a task that caused the fault. In each node 12, memory areas may include those owned by the PDE application and other memory areas. A task may be assigned predetermined sections of the various memory areas.

After the task-specific data has been collected from the dump 110, the diagnosis system 16 puts a task into execution (at 208) to ensure that the correct version of all dependent libraries are referenced and that the special CRN_PDELIB library 34 (FIG. 2) is associated with the task. The diagnosis system 16 also sets up (at 210) the run-time environment (the emulated or recreated environment 32 in FIG. 2) for the invoke procedure. During execution of the invoke procedure 30, special run-time events are handled (at 212).

In setting up the run-time environment, various shared libraries or dynamic link libraries (DLLs) may be loaded. Each of the various DLLs in the system 16 may reference other DLLs. As a result, as each of the libraries is loaded, the system 16 needs to resolve whether calls to such other DLLs will be made. As part of a set of defined procedures, a list of such calls are then built, with the entry points of such calls extracted. Dummy entry points are then built into the special CRN_PDELIB library 34 so that at least an error may be returned if a call is made to such dummy entry points. The Windows® operating system needs to know whether a code is executable or not. If a call is made to an entry point that does not exist, then the Windows® NT operating system may not even let the task begin.

In one embodiment, the debug module 120 (FIG. 2) may be used to start the invoke procedure. The debug module 120 may provide a user interface in which a user may enter an INVOKE command to start the invoke procedure. Upon receipt of the INVOKE command, the debug module 120 calls the CRN_RUNINVOKE routine 124, which drives the invocation process.

Figure 4:
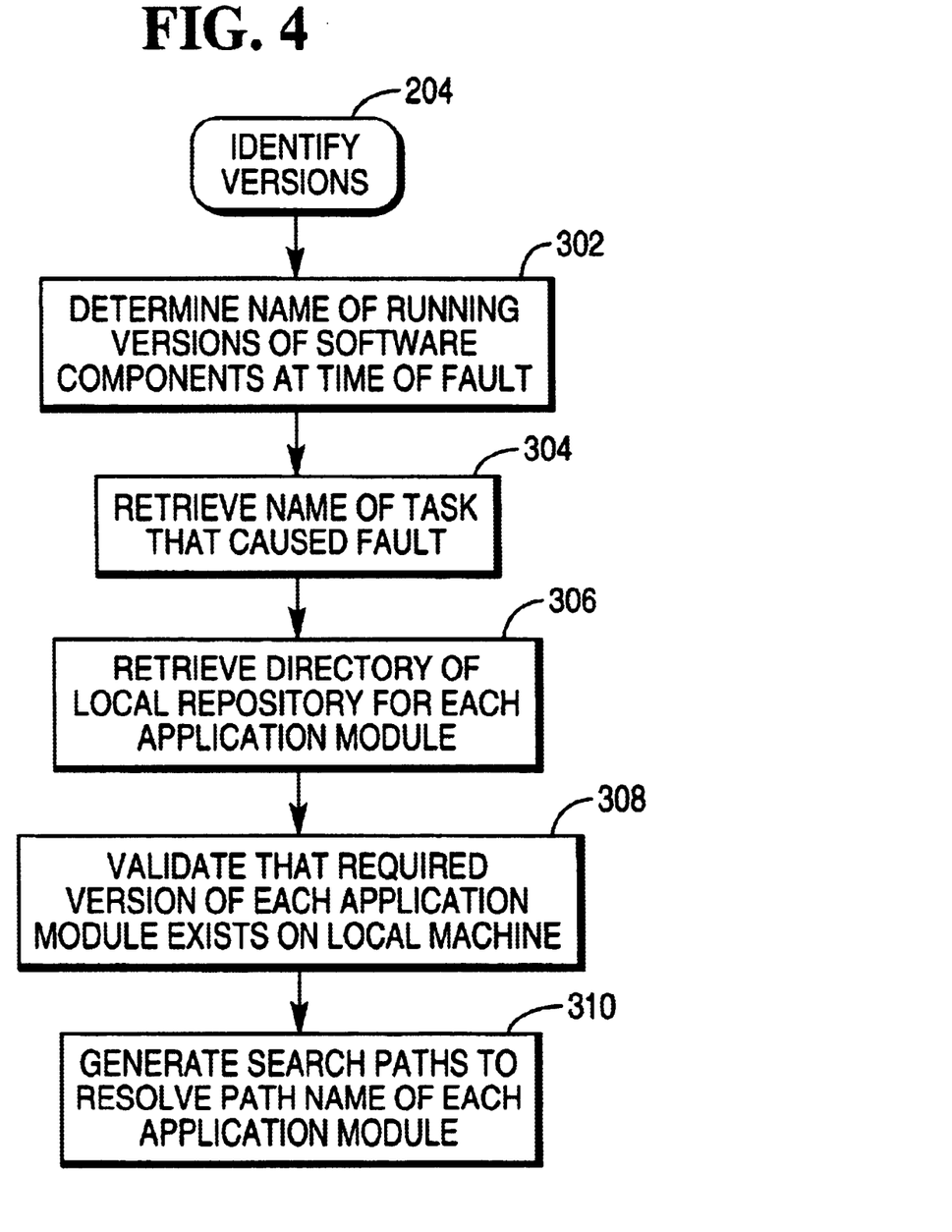
FIG. 4 is a flow diagram for identifying running versions of software modules that were present at the time of occurrence of a fault in accordance with an embodiment.

Referring to FIG. 4, the process of determining the running versions (204 in FIG. 3) at the time of the fault is illustrated. To access the dump 110, an interface referred to as the coroner subsystem 122 is used. The coroner subsystem 122 includes routines that can access contextual information about the dump 110 (e.g., when the dump was taken, which task initiated the dump process, and so forth) and access raw memory images in the dump 110 (e.g., memory address contents of specific tasks, contents of kernel memory areas, and so forth). The CRN_RUNINVOKE routine 124 issues a service call through the coroner subsystem 122 to determine (at 302) the active versions of the various application modules 22 (including the database application 40, gateway application 42, and PDE application 44) at the time the fault occurred. The CRN_RUNINVOKE routine 124 also retrieves (at 304) the name of the task that caused the fault.

Next, the CRN_RUNINVOKE routine 124 retrieves (at 306) the directory of the local repository for each of the application modules 22. Since the diagnosis may be occurring in the diagnosis system 16 instead of one of the nodes 12, the directory in the diagnosis system 16 may be different from that of the node 12 on which the dump information was taken. The CRN_RUNINVOKE routine 124 then validates (at 308) that the required version of each of the application modules 22 involved in the diagnosis is present in the local machine (in this case the diagnosis system 16). If the required version is present, then the CRN_RUNINVOKE routine 124 generates (at 310) a search path (which may be in the form of a series of directories), which is used to resolve the path name (location) of each individual application module.

Figure 5:
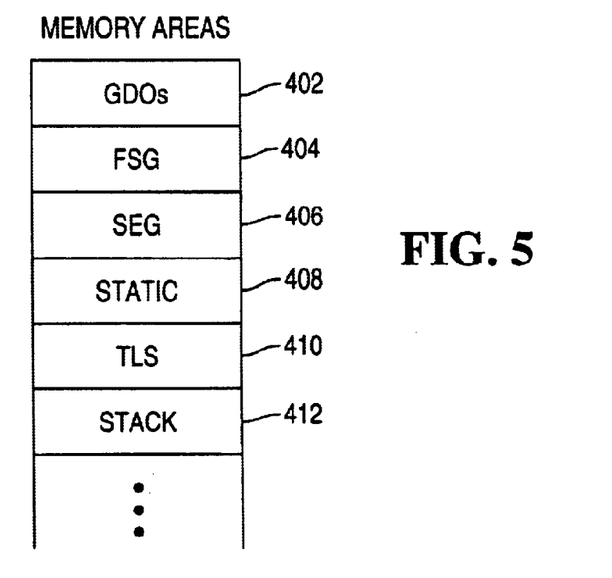
FIG. 5 illustrates memory areas that may be accessible by tasks running in the system of FIG. 1.

Referring to FIG. 5, various memory areas that may be accessible by various tasks are illustrated. The illustrated memory areas are provided for purposes of example only, and are not intended to limit the scope of the invention. Depending on the types of operating system and applications involved, different memory areas may be allocated. As noted in connection with FIG. 3, the memory sections addressed by the task that caused the exception is determined (at 206). This allows the CRN_RUNINVOKE routine 124 to re-establish the state of the memory at the time the fault occurred. FIG. 5 shows three memory areas owned by the PDE application: a Global Distributed Objects (GDO) memory area 402 (for storing configuration information such as the running version of each application module); a File System memory area 404; and a Scratch memory area 406. Other memory areas include a static memory area 408 (for storing static variables associated with shared or dynamic link libraries or DLLs), a thread local storage (TLS) memory area 410 (for storing arrays of pointers to data structures used by threads, with each thread associated with its own TLS), and a user stack (STACK) memory area 412.

To identify memory sections in the PDE-owned memory areas 402, 404, and 406, the CRN_RUNINVOKE routine 124 calls the routines in the coroner subsystem 122 to analyze the memory image contained in the dump 110 to identify the appropriate memory sections. For the other memory areas (408, 410, and 412), the CRN_RUNINVOKE routine 124 accesses the executable and shared libraries associated with the task that caused the fault to identify the memory sections.

After the memory sections associated with the executable and shared libraries are identified, the CRN_RUNINVOKE routine 124 may build a table of contents (TOC) to describe each section, the address range of each section in memory, and a file that contains the contents (the memory information extracted from the dump 110). The TOCs may be used in subsequent invocations of the invoke procedure associated with the same task. By building the TOCs and extracting the data into files, the cost of subsequent invocations of invoke procedures may be greatly reduced, since the TOCs and files may be reused. This allows the identifying of memory sections and extracting of data from the dump 110 to be skipped. In addition, to the extent that some of the memory sections are shared by several tasks, the TOCs and files for the shared memory sections may be reused.

Figure 6:
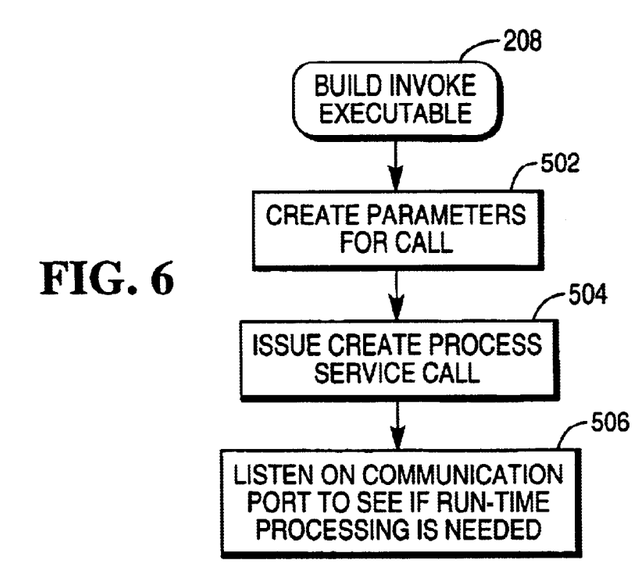
FIG. 6 is a flow diagram of a process of building an invoke task to perform diagnosis of the system of FIG. 1 in accordance with an embodiment.

Referring to FIG. 6, after the memory sections have been identified, a task that runs the invoke procedure is executed (208 in FIG. 3). This may also be referred to as building the invoke executable or invoke task. First, parameters that are passed to the invoke executable are generated (at 502) by the CRN_RUNINVOKE routine 124. The parameters include the address of the actual invoke procedure to execute, the set of TOCs and data files containing the memory information, and a set of communication ports (which may be implemented as mailboxes) for communicating between the CRN_RUNINVOKE routine 124 and the invoke executable. The parameters may also include any other parameters that are specified when the user issued the INVOKE command from the debug module 120.

Next, the CRN_RUNINVOKE routine 124 issues the CreateProcess service call (at 504) defined by the WINDOWS® operating system. The CreateProcess call creates a process, in this case the invoke executable. The parameters created at 502 are passed along with the CreateProcess service call. This puts into execution the invoke executable. The CRN_RUNINVOKE routine 124 then listens (at 506) on the appropriate communications port to determine if run-time processing is needed by the invoke procedure.

Figure 7:
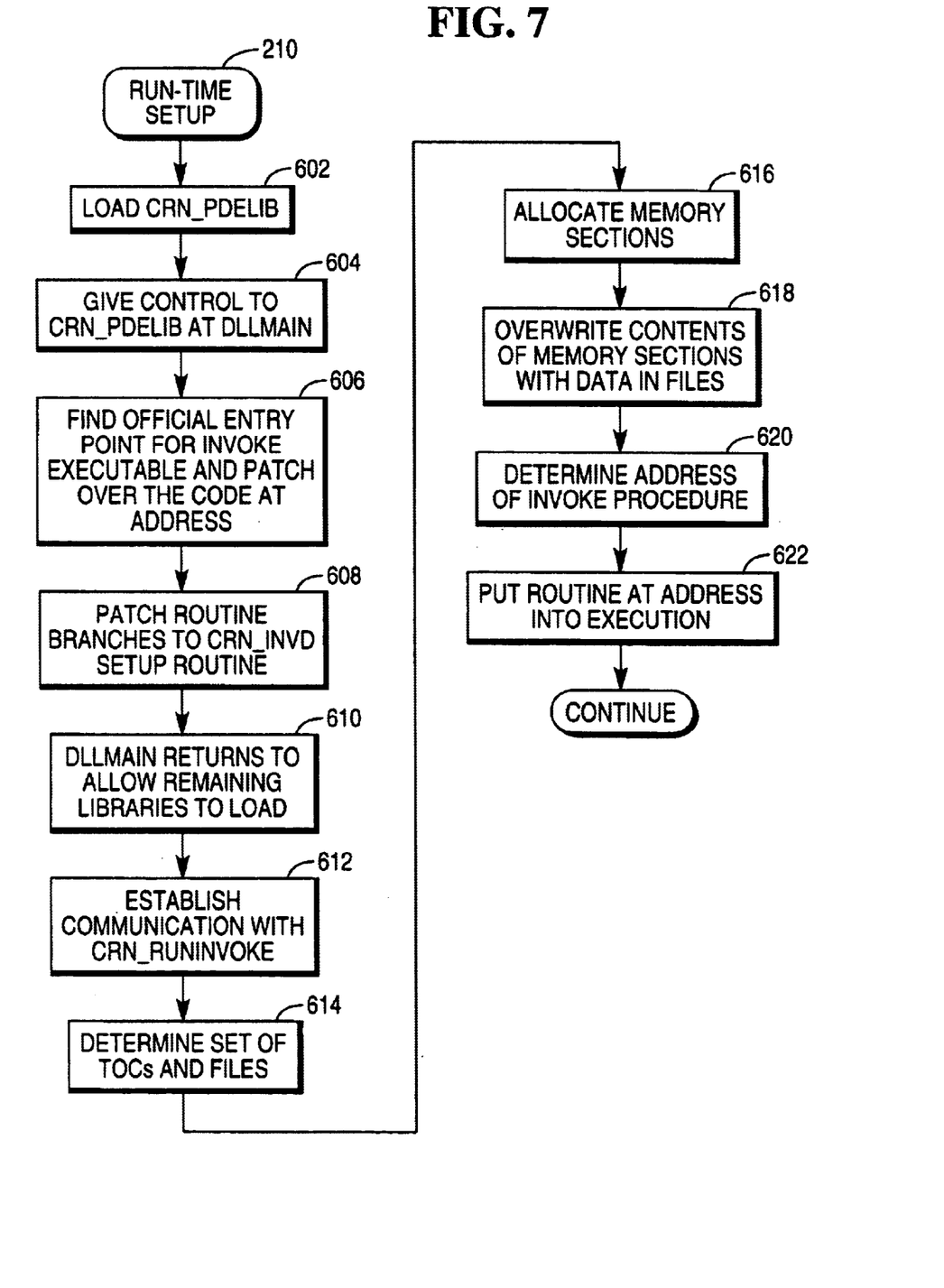
FIG. 7 is a flow diagram of a process for run-time setup to set up the emulated runtime environment in accordance with an embodiment.

Referring to FIG. 7, the run-time setup for the invoke procedure (210 in FIG. 3) is performed next. When the invoke executable is put into execution, the special CRN_PDELIB library 34 (FIG. 2) is loaded (at 602). As noted above, the special CRN_PDELIB library 36 is substituted for the regular PDELIB library 34 executed in each of the nodes 12 during live operation. The regular PDELIB library 34 provides the interface to service routines of the PDE application 44. Thus, during execution in each node 12, calls to the service routines of the PDE application 44 are handled by the PDELIB library.

The substitute CRN_PDELIB library 36 contains all the same entry points for PDE service routines as the regular PDELIB library 34. However, instead of operating in, a real run-time environment, the substitute CRN_PDELIB library 36 is designed to operate in the emulated run-time environment 32. As an example, one PDE service routine (referred to as SegExist) determines whether a memory section has been previously allocated. The PDE service routine in the regular PDELIB library 34 issues a kernel service call to determine the state of the running system with respect to the specified memory section. In contrast, the SegExist service routine in the substitute CRN_PDELIB library 36 examines the status of the system as represented in the dump 110 to determine the answer. For each entry point in the PDELIB library 34, the substitute CRN_PDELIB library 36 either emulates the function (similar to SegExist example) or returns an error indicating that the service is not supported.

When the CRN_PDELIB library 36 is loaded, it is automatically given (at 604) control at a special entry point known as DLLMAIN (140 in FIG. 2). This special entry point for a library is defined by the WINDOWS® operating system. The special entry point gains control when the library is loaded. The special entry point occurs before the normal entry point of the invoke executable is given control. As a result, by declaring the special entry point DLLMAIN for the CRN_PDELEB library 34, an opportunity is provided to take control away from the normal entry point of the invoke executable. If the invoke executable is allowed to start at its normal entry point, then it may think that it is executing in a live system. Next, the routine 140 at the DLLMAIN entry point in the CRN_PDELIB library 36 finds (at 606) the official entry point for the invoke executable and patches over the code at that address. The patch routine then branches (at 608) to a setup routine (CRNINVD) 144 (FIG. 2), also contained in the CRN_PDELIB library 36. DLLMAIN 140 then returns (at 610) to allow the rest of the libraries associated with the invoke executable to be loaded and initialized.

Once the CRNINVD routine 144 gets control back, the run-time environment setup for the invoke procedure can begin. The CRNINVD routine 144 establishes (at 612) communication with the CRN_RUNINVOKE routine 124 through the communication ports specified on the command line. The CRNINVD routine 144 also determines (at 614) from the command line the set of TOCs and files that are needed.

Using the information in the TOCs and files, the CRNTNVD routine 144 allocates (at 616) one or more of the memory sections (e.g., FSG, SEG, GDO, STATIC, TLS) to the invoke executable. The CRNINVD routine 144 then overwrites (at 618) the contents of the allocated memory sections with the contents of the files, which are extracted from the dump 110.

The address of the invoke procedure is then identified (at 620) by the CRNINVD routine 144. The routine at the identified address is next put into execution (at 622). Original parameters entered by the user with the INVOKE command from the debug module 120 may also be passed to the invoke procedure.

Figure 8:
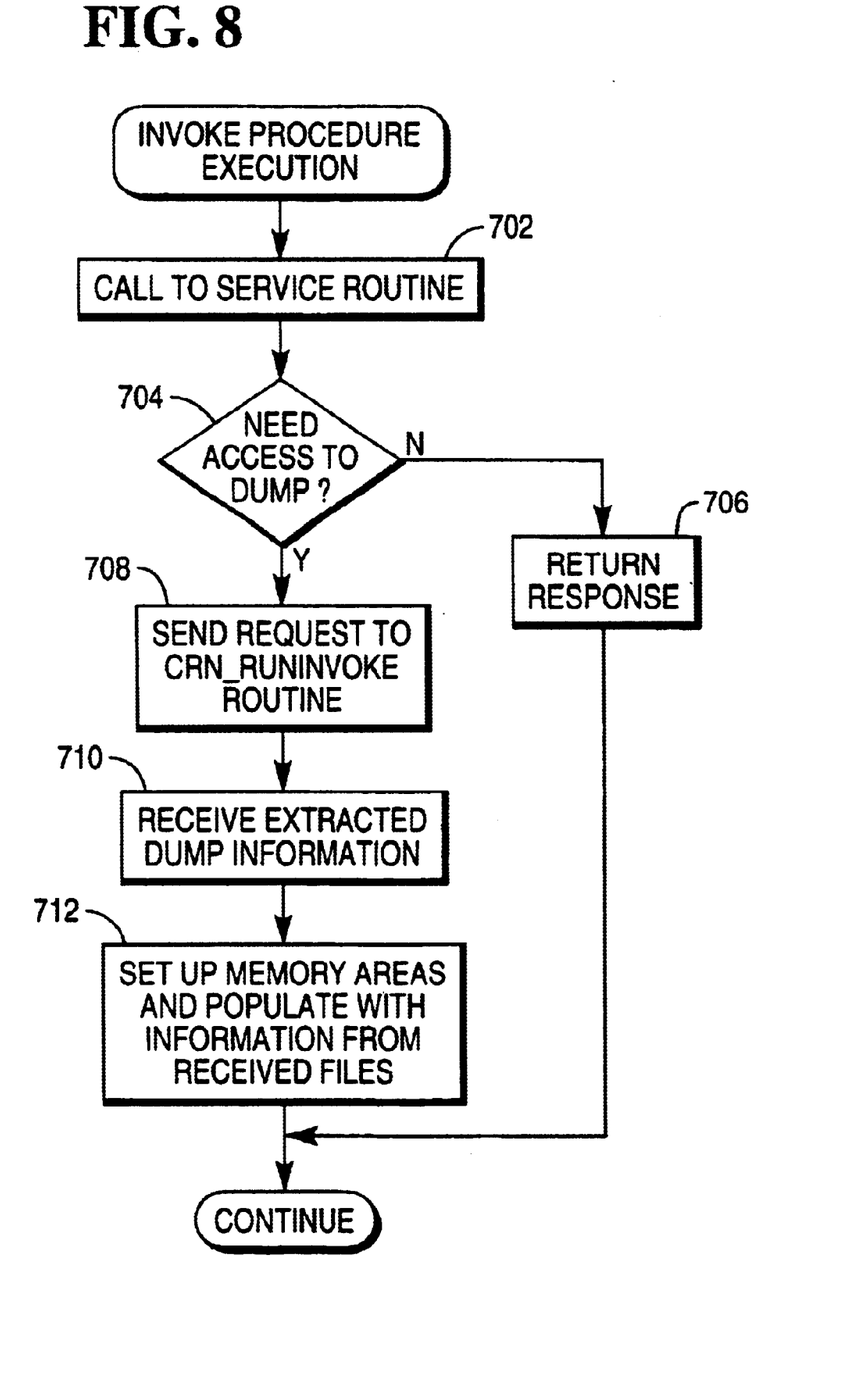
FIG. 8 is a flow diagram illustrating handling of requests from an invoke procedure in accordance with an embodiment.

Referring to FIG. 8, during the execution of the invoke procedure, as mentioned above, calls to PDE service routines (at 702) are transferred to the routine with the same name in the CRN_PDELIB library 36. The CRN_PDELIB library 36 determines (at 704) which two categories the call falls into: those that can be handled substantially immediately by the CRN_PDELIB library 36 and those that require additional information from the dump 110. If the call can be handled immediately, the response is returned (at 706) and execution of the invoke procedure can continue.

However, if access to the dump 110 is needed, the PDE service routines in the CRN_PDELIB library 36 may use communication ports previously established to send (at 708) requests to the CRN_RUNINVOKE routine 124. In response, the CRN_RUNINVOKE routine 124 extracts the requested information from the dump 110 and returns the information (at 710) to the invoke procedure. The received information is in the form of TOCs and files to represent the extracted data. The invoke procedure then sets up (at 712) the new memory sections and populates with the extracted dump information from the files.

An advantage of creating a new task (the invoke executable) to run an invoke procedure is that if the procedure aborts due to unexpected situations, only the invoke procedure itself is affected. Since CRN_RUNINVOKE is part of the coroner subsystem 122, it will survive failures of the invoke procedure. In addition, the CRN_RUNINVOKE routine 124 also ensures that resources owned by the invoke executable can be freed whether the invoke executable exits normally or abnormally.

For normally terminating invoke procedures, a message is sent through established communication ports indicating that the procedure has finished. To ensure that the same is true of abnormal terminations, the CRN_RUNINVOKE routine 124 waits on the handle returned on the CreateProcess call used to launch the invoke executable. If the invoke executable terminates unexpectedly, the wait on the handle will be satisfied (after a time out) and the CRN_RUNINVOKE routine 124 can perform any required cleanup.

The various software layers, routines, or modules described herein may be executable on various processing elements as shown in FIG. 2, such as the one or more control units 109. The one or more control units 109 are coupled to one or more storage devices 108. Each control unit 109 may include a microprocessor, a microcontroller, a processor card (including one or more microprocessors or microcontrollers), or other control or computing devices. As used here, a "controller" can refer to either hardware or software or a combination of both.

Each storage device 108 may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software layers, routines or modules in the various systems or nodes may be stored in respective storage devices. The instructions when executed by a respective control unit cause the corresponding system to perform programmed acts.

The instructions of the software layers, routines, or modules may be transported to a respective system in one of many different ways. For example, code segments including instructions stored on floppy disks, CD or DVD media, a hard disk, or transported through a network interface card, modem, or other interface device may be loaded into the system and executed as corresponding software layers, routines, or modules. In the loading or transport process, data signals that are embodied in carrier waves (transmitted over telephone lines, network lines, wireless links, cables, and the like) may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use in a system, comprising:
   starting a task capable of executing in an environment emulated from dump information;
   loading a first library having a special entry point before the main entry point of the task; and
   taking control at the special entry point.

2. The method of claim 1, further comprising launching a setup routine to set up the emulated environment.

3. The method of claim 2, wherein setting up the emulated environment includes overwriting one or more memory sections with data extracted from the dump information.

4. The method of claim 1, further comprising calling a routine needing access to the dump information.

5. The method of claim 4, further comprising sending a request to another routine to access the dump information.

6. The method of claim 1, wherein the first library is a substitute for a run-time library for operating in a run-time environment, the first library including one or more routines that are capable of sending requests for access to the dump information.

7. An article including one or more machine-readable storage media containing instructions that when executed cause a first node to:
   recreate a run-time environment from dump information including information associated with one or more threads;
   perform a diagnosis operation in the recreated run-time environment,
   wherein the dump information is created in another node; and
   identify versions of software running in the other node and to check if the versions are present in the first node,
   wherein multiple versions of at least one software are present in the first node.

8. The article of claim 7, wherein the instructions when executed cause the first node to receive the dump information that is saved in response to a fault.

9. The article of claim 7, wherein the instructions when executed cause the first node to identify a task causing a fault and to identify memory areas associated with the task.

10. An article including one or more machine-readable storage media containing instructions that when executed cause a system to:
    recreate a run-time environment from dump information including information associated with one or more threads;
    perform a diagnosis operation in the recreated run-time environment; and
    load a special library and give control to the special library at a predetermined entry point other than a main entry point.

11. The article of claim 10, wherein the instructions when executed cause the system to execute a routine to set up the run-time environment.

12. The article of claim 11, wherein the instructions when executed cause the system to allocate memory sections with content from the dump information to set up the run-time environment.

* * * * *